United States Patent [19]
Jasper et al.

[11] Patent Number: 5,241,544
[45] Date of Patent: Aug. 31, 1993

[54] MULTI-CHANNEL TDM COMMUNICATION SYSTEM SLOT PHASE CORRECTION

[75] Inventors: Steven C. Jasper, Hoffman Estates; Mark A. Birchler, Roselle, both of Ill.

[73] Assignee: Motorola, Inc., Schaumburg, Ill.

[21] Appl. No.: 786,440

[22] Filed: Nov. 1, 1991

[51] Int. Cl.$^5$ .................... H04L 7/04; H04L 27/01
[52] U.S. Cl. .................... 370/105.3; 375/14; 375/111
[58] Field of Search .................... 370/19, 20, 21, 69.1, 370/122, 123, 104.1, 105.2, 105.3; 375/15, 14, 58, 57, 60, 39, 99, 101, 111, 118

[56] References Cited

U.S. PATENT DOCUMENTS

| | | | |
|---|---|---|---|
| 4,464,767 | 8/1984 | Bremer | 370/20 |
| 4,494,239 | 1/1985 | Martin | 370/20 |
| 4,730,344 | 3/1988 | Saha | 370/20 |

Primary Examiner—Wellington Chin
Attorney, Agent, or Firm—John W. Hayes

[57] ABSTRACT

In a digital communication system in which pulse-shape filtered sync, pilot, and data symbols, arranged in successive time slots, modulate sub-channel carriers via sub-channel mixers to form sub-channel symbol streams for combination into a composite signal for transmission, deterministic portions of each time slot are rendered identical by determining phase difference of sub-channel carriers and rotating the phase of each sub-channel symbol stream by an amount equal to the phase difference, but with opposite sign.

6 Claims, 3 Drawing Sheets

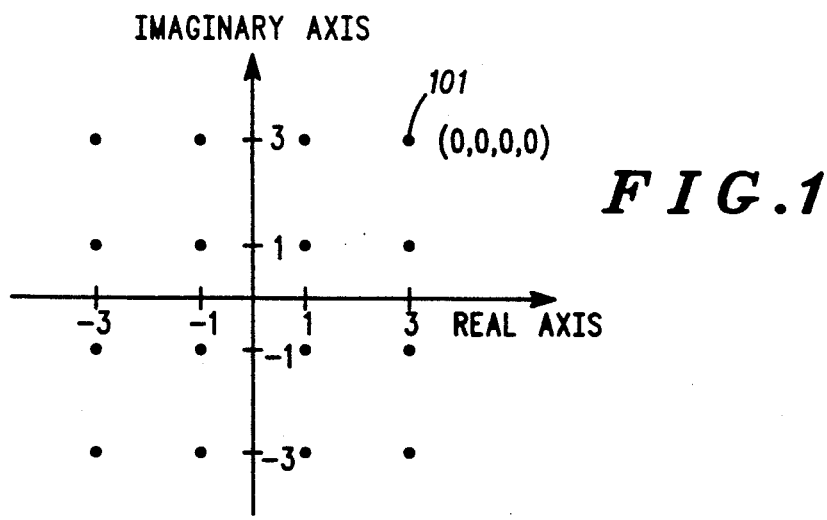
FIG. 1
FIG. 2
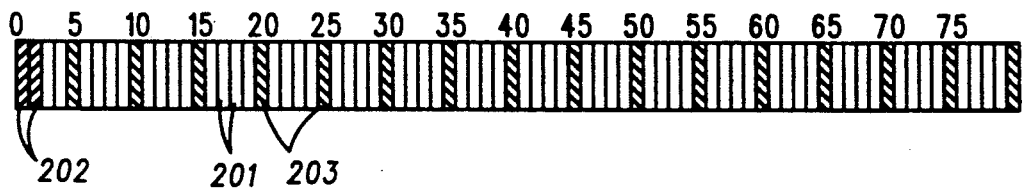
FIG. 4
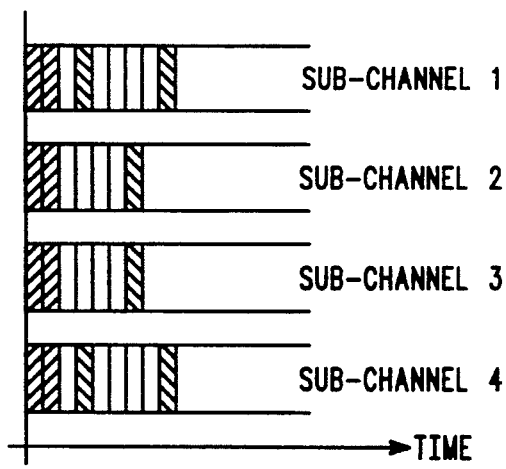
FIG. 5
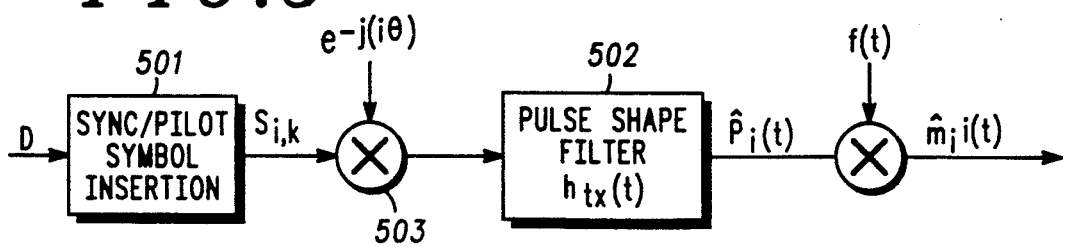

MULTI-CHANNEL TDM COMMUNICATION SYSTEM SLOT PHASE CORRECTION

TECHNICAL FIELD

This invention relates generally to communication systems and in particular to multi-channel TDM (time-division multiplex) communication systems, and is more particularly directed toward compensating for sub-carrier phase differences so that deterministic symbol stream portions will be substantially identical from time slot to time slot.

BACKGROUND OF THE INVENTION

Much research has been conducted in recent years in an effort to adapt digital signal processing techniques for use in communication systems. These research efforts have been spurred by the development of the digital signal processor (DSP), which, as is well-known in the art, is an integrated circuit similar to a microprocessor that allows mathematical operations crucial to signal processing applications to be performed at very high speeds. The use of a DSP vastly simplifies the realization of finite impulse response filters, for example, and computation of Fast Fourier Transforms can now be done at speeds unprecedented for small, integrated circuit devices.

The principal attraction of DSP's to designers is flexibility. Since a DSP is a software-driven device, it is a relatively simple matter to change the entire complexion of a DSP-based communication unit simply by changing software. For example, an FM (frequency modulation) system can be changed to an AM (amplitude modulation) system by re-programming DSP ROM (read only memory).

The use of a DSP also means increased flexibility in terms of communication system features. New features can be added quickly and easily by reprogramming, and the latest improvements in signal processing algorithms can be added to improve system performance.

Perhaps most importantly, designers are not limited by considerations of physical realizability that hamper the designers of analog systems. If a filter or other function can be expressed mathematically and executed in a DSP (within any constraints on execution time dictated by the nature of the system in question, of course), the designer simply programs the function into the DSP without having to worry about selection of the proper resistors, capacitors, inductors, or other components that would be part of a physical system. A DSP-implemented filter is also infinitely repeatable in its performance, unlike physical filters, which are affected by factors such as aging and temperature.

Since DSP-based systems are inherently very flexible, the task of determining which of many modulation and transmission protocols best fits a particular application is greatly simplified. Very complex systems may be implemented with relative ease, thus helping to ensure that system performance is maximized.

One of the problems faced by any RF (radio frequency) communication system designer is that of frequency-selective fading. This phenomenon results from reflection of transmitted signals and the interaction of these reflections as they arrive at the receiver. Each reflected signal has its own delay and phase, and, when the reflections interact with the original transmitted signal, inter-symbol interference is the usual result, at least in a data system. This type of interference makes proper interpretation of transmitted signals difficult.

The use of multiple sub-channels helps to counteract the effects of frequency-selective fading. Each sub-channel is formed by modulating a sub-carrier signal with some portion of the information signals to be transmitted. Then, a composite signal is formed by combining these sub-channels, and the composite signal is used to modulate a primary carrier.

In one such system, sixteen symbol quadrature amplitude modulation, or 16-QAM, is used to transmit information signals arranged into TDM time slots, with each time slot having sync and pilot symbols inserted in a predetermined pattern among the data symbols to be transmitted. As is well-known in the art, sync symbols allow the receiver to determine exactly when data symbols and pilot symbols will arrive, so that the input signal (or input symbol stream, as it is sometimes termed) may be sampled in exactly the proper places. Pilot symbols, which are predetermined symbols, are used to measure and compensate for the effects of the channel on the data symbols themselves.

Although this system tends to work well in the presence of frequency-selective fading, there are some problems that merit consideration. Even though the sub-carriers used to form the sub-channels may quite easily be started with a known phase at the beginning of the first time slot, by the beginning of the subsequent time slot the phase will generally be different. This means that, even if the same sync symbols and pilot symbols are used for each time slot, the sync and pilot symbols received will be different for every time slot by virtue of this sub-carrier phase shift.

An important consequence of this phase shift is that sync signal detection cannot be accomplished prior to demodulation without adding significant complexity. If the sync signals can be guaranteed to be identical at the composite signal level for every time slot, then a single matched filter can be used for sync timing detection.

A similar problem affects the ability to use pilot symbols to characterize channel effects. An optimum system should have the ability to detect a variety of pilot symbols, although a very large set of pilot symbols introduces an undesirable decoding burden. Since peak-to-average power considerations are important in the design of power amplifiers (PA's) for linear systems, it is desirable to retain the ability to use elements of a fairly large set of pilot symbols. This is because the pilot symbols represent a deterministic portion of the symbol stream, and pilot symbol values can be specifically selected to minimize peak-to-average power.

Accordingly, a need arises for a method for compensating for sub-carrier phase shift without adding unnecessary complexity to the system under consideration.

SUMMARY OF THE INVENTION

These needs and others are satisfied by the method of the present invention. In a digital communication system in which pulse-shape filtered sync, pilot, and data symbols, arranged in successive time slots, modulate sub-channel carriers via sub-channel mixers for combination into a composite signal for transmission, wherein each time slot includes a deterministic portion comprising sync and pilot symbols and a non-deterministic portion comprising data symbols, the method ensures that the deterministic portion of each time slot is substantially identical in each time slot. First, the phase difference of the sub-channel mixer signals from the start of a first time slot to the start of a second, subsequent time slot is determined, then the phase of each sub-channel symbol stream is rotated, on a per-slot basis, by an amount equal to that phase difference, but with opposite sign.

BRIEF DESCRIPTION OF THE DRAWINGS

FIG. 1 is a symbol constellation for a 16-QAM communication system;

FIG. 2 illustrates a possible time slot format for a sub-channel symbol stream;

FIG. 4 shows the time-domain relationship between sub-channel symbol streams;

FIG. 5 depicts an arrangement for compensating for sub-carrier phase shift;

DESCRIPTION OF A PREFERRED EMBODIMENT

A 16-QAM system such as that contemplated by the Applicants' invention employs an input alphabet of sixteen discrete symbols. For quadrature modulation, these symbols are perhaps best envisioned as points in a cartesian coordinate system having real and imaginary axes, such as the one shown in FIG. 1. This arrangement is often referred to as a symbol constellation. An input symbol (101) may be characterized as a complex number, $3+j3$. Each input symbol may also be associated with a binary 4-tuple ($b_0,b_1,b_2,b_3$), since there are sixteen symbols in the alphabet. The input symbol (101) just described may be associated with the 4-tuple (0,0,0,0), for example, with the other symbols uniquely mapped onto the set of binary 4-tuples as well.

Figure 3:
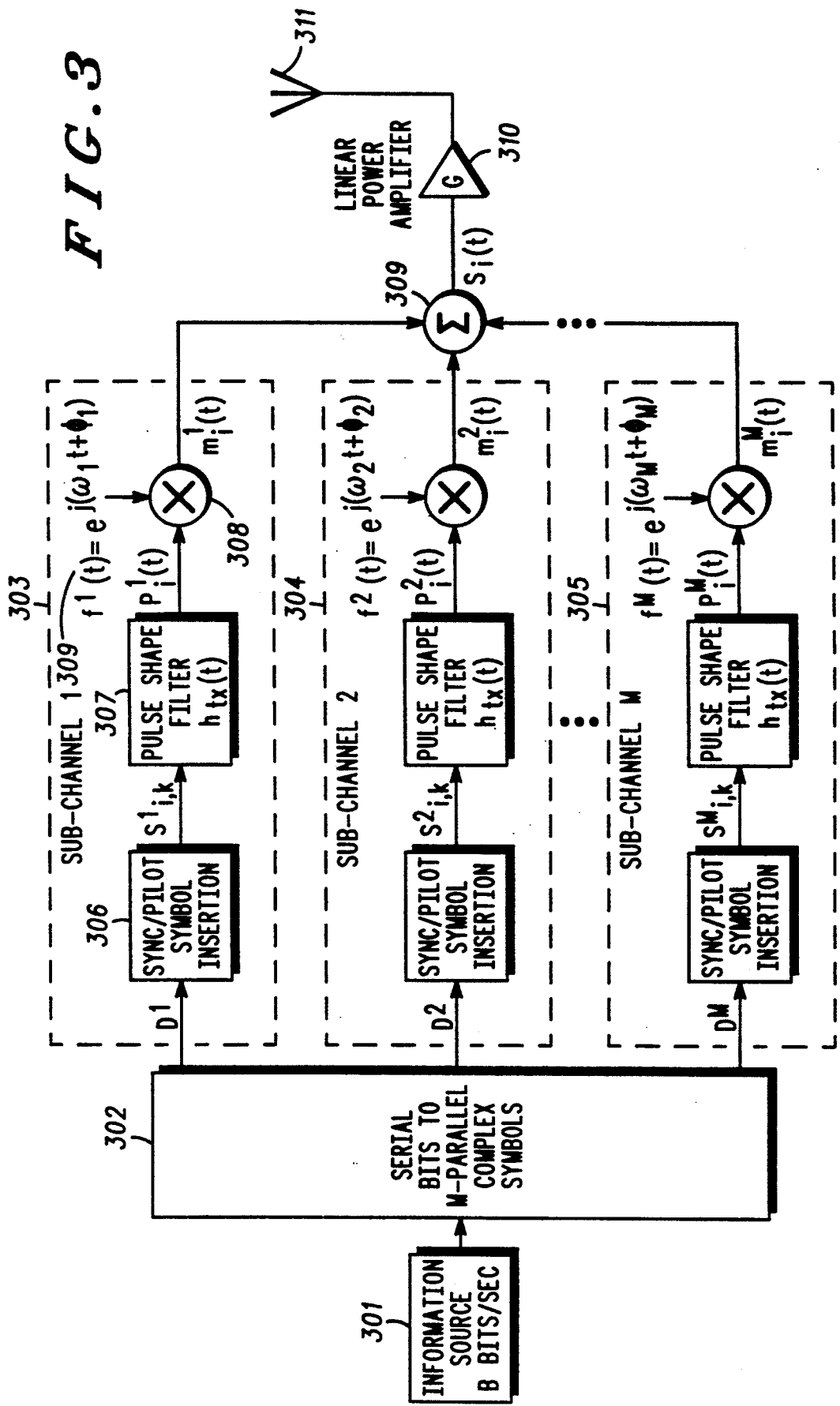
FIG. 3 is a block diagram of a 16-QAM communication system transmitter.

The reason for associating each member of the input alphabet with a set of binary bits becomes obvious when considered in light of FIG. 3, which illustrates a multi-sub-channel 16-QAM transmitter in block diagram form. An information source (301) comprising a binary data stream is applied to a serial-to-parallel converter (302) which parses the input data stream into groups of four binary bits. Each of these groups is then associated with the appropriate element of the input alphabet.

Turning briefly to FIG. 2, an illustration of a typical TDM time slot is shown. Time slots are comprised mostly of data symbols (201) selected from the symbol constellation. Sync symbols (202) are provided at the beginning of the time slot to allow a receiver to determine exact position in the symbol stream, so that symbol sampling will occur at precisely the right time. The symbol stream also includes predetermined pilot symbols (203) inserted at selected intervals. The pilot symbols are used by the receiver to calculate the effects of the communication channel on the received symbol stream.

It is well-known that communication channels introduce noise and distortion. Since the receiver knows the pilot symbols that will be transmitted, a comparison can be made between the pilot symbols received and the pilot symbols transmitted, thus permitting the receiver to closely approximate channel effects. The received symbol stream can be adjusted to compensate for phase and amplitude errors by applying a correction factor derived from this comparison.

Returning to FIG. 3, the 16-QAM system is shown with processing blocks (303-305) for each sub-channel. Although the figure is generalized for M sub-channels, four sub-channels are employed in the preferred embodiment of the invention. As discussed previously, division of the signal into sub-channels is an effective way to combat the phenomenon of frequency-selective fading.

Examining the processing block (303) for the first sub-channel in more detail, an input symbol stream $D^1$ is provided by the serial-to-parallel converter (302). The serial-to-parallel converter (302) provides a symbol stream for each sub-channel simply by assigning a first data symbol to the first sub-channel, the subsequent data symbol to the second sub-channel, etc. The first operation that occurs in individual sub-channel processing is the insertion of sync and pilot symbols (306). This operation makes the sub-channel symbol streams for each sub-channel appear much as depicted in FIG. 2. The sub-channel symbol stream is then filtered by a pulse shape filter (307). Although this filtering operation may seem somewhat abstract, since the filter is actually a mathematical algorithm being applied to a sequence of samples within a DSP, the filtering operation has much the same result as a physical pulse shaping filter applied to a series of signal pulses. The signal bandwidth is reduced to avoid splatter.

Next, each sub-channel symbol stream must be frequency translated to the appropriate sub-carrier frequency. This frequency translation is accomplished by a simple mixer (308), which, again, represents a mathematical operation performed inside the DSP. The sub-channel symbol stream modulates a sub-carrier signal (309) which is applied to the mixer (308). Of course, each sub-carrier is a different frequency, chosen to minimize both total bandwidth of the composite signal and inter-sub-channel interference.

After the sub-channel symbol streams have been shifted up to their sub-carrier frequencies, these sub-channel outputs are combined (309) to form a composite signal. The composite signal is provided to a linear power amplifier (310) which amplifies the signal prior to transmission via an antenna (311). Since 16-QAM is a linear modulation system, the power amplifier (310) must not introduce significant distortion to the composite signal. The peak-to-average power ratio of the composite signal is a critical parameter for the designers of the power amplifier, since the extent to which the peak power value differs from average dictates the extent of the input signal range of the amplifier. A composite signal having a large peak-to-average ratio may require a power amplifier having a totally unrealizable input dynamic range.

The symbol streams within a multi-channel, time-domain pilot-based, TDM, linear modulation system, such as the one described, have both deterministic and non-deterministic portions. The sync and pilot symbols, since they are predetermined for a given system, are completely deterministic. The data symbols are not, however, since the designer has no way of predicting the exact sequence in which data symbols may occur. Since sync symbols are inserted at the beginning of each time slot, the sync symbols add together when the composite signal is formed. Pilot symbol insertion may be controlled such that the pilot symbols within each sub-channel stream also occur simultaneously, with resultant reinforcement when the sub-channels are added together to form the combined signal. In the preferred embodiment, pairs of sub-channels have coincident pilot symbols, so only two pilot symbols at a time are actually added together when the composite signal is formed. FIG. 4 shows portions of the sub-channel symbol streams illustrating the coincidence of sync and pilot symbols from each sub-channel. Note that sync symbols from all sub-channels are coincident, while pilot channels 1 and 4 have coincident pilot symbols. Sub-channels 2 and 3 have coincident pilots as well, but occurring at different times than the pilots in sub-channels 1 and 4.

A significant consideration in the design of a system such as the one described is the phase of the sub-carrier signals. Even if sub-carrier phase is controlled such that each sub-carrier has zero phase at the start of the first time slot, by the start of the second time slot the sub-carrier phases may no longer be zero. Because of this phase difference, sync and pilot signals transmitted in subsequent time slots may no longer be identical. Not only does this phase difference complicate sync detection by precluding a single matched filter approach applied to the received composite signal, but it means that coincident pilot symbols may reinforce, in a way difficult to predict at best, such that an unfavorable peak-to-average power situation develops. Controlling peak-to-average power during the deterministic portions of the symbol streams is one of the most effective ways to limit overall peak-to-average problems. Of course, little can be done about the non-deterministic portions, when data symbols are transmitted, but the random nature of specific data symbol occurrences helps to limit their impact on peak-to-average power. The present invention offers a way to solve this sub-carrier phase problem in such a way that sync and pilot signals in successive time slots will, in fact, be identical.

The following development will be significantly simplified if one first notes that if each constituent sub-channel signal has an identical deterministic component for each slot, then so will the composite transmitted signal. Thus, demonstrating the accomplishment of the desired result on a single sub-channel is sufficient.

A sub-channel signal just before summation for TDM time slot i can be expressed as shown below. Note that this definition assumes that there is zero energy overlap between time slots. Although this assumption does not quite hold true in an actual system, it does simplify the mathematical development with negligible effect on its validity. For the system illustrated in FIG. 3, the sub-channel signal $m_i(t)$ just before summation for TDM time slot number i is as follows (sub-channel frequency identification has been dropped since it is irrelevant to the problem at hand):

$$m_i(t) = \sum_{k=0}^{N-1} [S_{i,k}\delta(t - kT_{symb} - iT_{slot}) * h_{tx}(t)]e^{j(\omega t + \phi)}$$

Where
$S_{i,k}$ = the Pilot or Data symbol of slot $i$ at slot symbol position $k$
$h_{tx}(t)$ = the impulse response of the TX pulse shape filter
$T_{symb}$ = the symbol period
$N$ = the number of symbols per slot
$T_{slot}$ = the TDM slot period
     = $N T_{symb}$
$\omega$ = the subchannel modulation frequency
$\phi$ = the initial phase of the subchannel mixer
$\delta(t)$ = the delta or impulse function
and
$x * y$ implies the time convolution of $x$ by $y$.

This expression can be simplified by making the following definitions:

$$p_i(t) = \sum_{k=0}^{N-1} [S_{i,k}\delta(t - kT_{symb} - iT_{slot}) * h_{tx}(t)]$$
$$f(t) = e^{j(\omega t + \phi)}$$
Thus:
$$m_i(t) = p_i(t)f(t)$$

Assume that the system is sending only sync/pilot symbols. That is, that data symbols are set to zero, leaving the sync/pilot symbols unaffected. In this case, the transmitted signal $m_i(t)$ is completely deterministic. One possible formal definition of this condition is shown below:

$$S_{i,k} = S_{i+1,k} \text{ for all } i$$

Recall that one must assume that only the deterministic symbols (i.e., sync/pilot) of the slot are being transmitted. For this special case, it is easy to show that, in general:

$$p_{i+1}(t) = p_i(t - T_{slot})$$

$$f(t + T_{slot}) \neq f(t)$$

These equations indicate that the pre-mix sub-channel signals are simply time translated replicas of each other, but the sub-channel mixer signals are not. Both conditions have to be true if the deterministic part of $m_i(t)$ is to remain constant from slot to slot.

The phase difference factor between adjacent slots can be determined by expanding $f(t+T_{slot})$ from the previous equation. That is:

$$f(t + T_{slot}) = e^{j[\omega(t+T_{slot})+\phi]}$$
$$= e^{j\omega T_{slot}}f(t)$$
$$= e^{j\theta}f(t)$$

This result indicates that each sub-channel phasor advances by the factor $\theta$ from the start of the current slot to the start of the next slot. This effect can be neutralized by rotating the symbol constellation of each sub-channel by $-\theta$ on a per slot basis. Thus, the new expression for $m_i(t)$ becomes:

$$\hat{m}_i(t) = \sum_{k=0}^{N-1} [e^{-j(i\theta)}S_{i,k}\delta(t - kT_{symb} - iT_{slot}) * h_{tx}(t)]e^{j(\omega t + \phi)}$$

Now, with this slot phase correction algorithm, it can be shown that:

$$\hat{m}_{i+1}(t) = \hat{m}_i(t - T_{slot})$$

Thus, it has been shown that the deterministic part of each slot is identical for all slots. FIG. 5 indicates how the phase correction algorithm of the present invention is applied. Between sync/pilot symbol insertion (501), which has been described for sub-channel 1 in conjunction with FIG. 3 above, and pulse shape filtering (502), also described previously, the sub-channel symbol stream is rotated, via a mixing operation (503), by $-\theta$.

Figure 6:
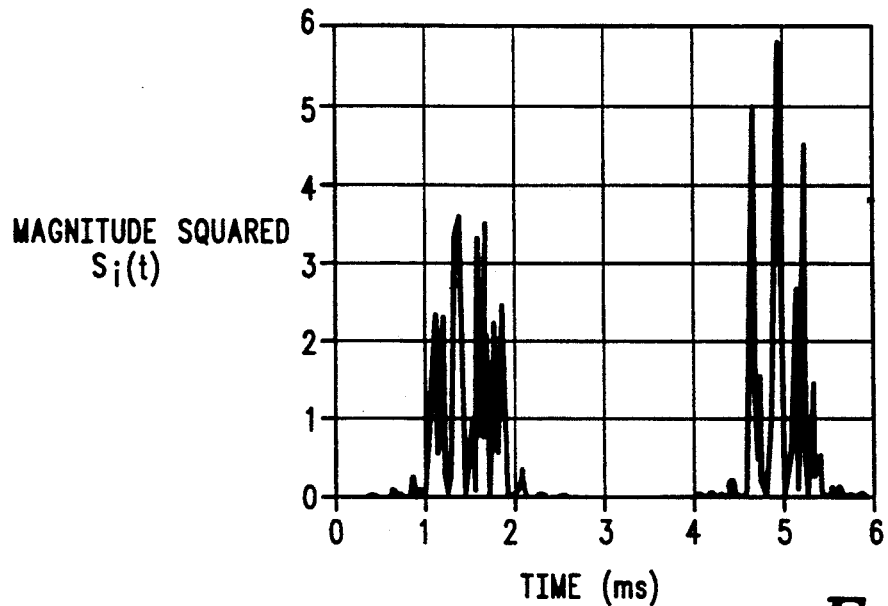
FIG. 6 illustrates differences in successive sync signal power without phase correction.
Figure 7:
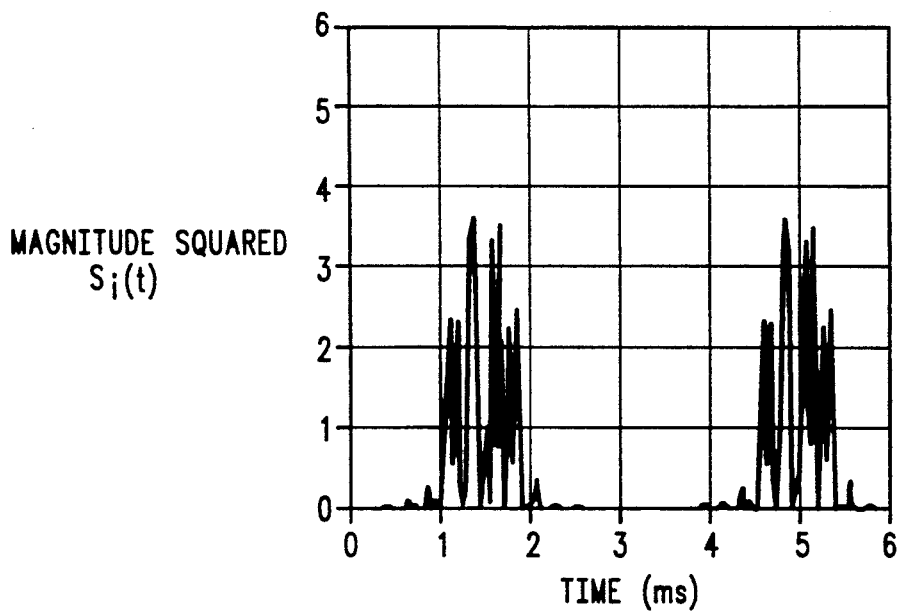
FIG. 7 illustrates successive sync signals with phase correction.

In order to view the result of the operation described using computer simulation, four sub-channel symbol streams were created. The transmitted slot comprised three sub-channel sync symbols followed by eleven "zero" data symbols. The zero data symbol is the symbol corresponding to the point 0+j0 in the symbol constellation of FIG. 1. The consecutive transmission of the zero data symbol simply removes any random component from the simulation. FIG. 6 shows magnitude squared for two consecutive sync signals without the aid of phase correction. Note that they are not only different, but the second signal has significantly greater peak-to-average power. In FIG. 7, with the aid of phase correction, the sync signals are identical.

Although the preferred embodiment has been described, there remains an alternative method for ensuring that sync and pilot symbols remain identical for each time slot. By judicious selection of sub-carrier frequencies and time slot durations, it is possible to arrange for a sub-carrier to have zero phase after n time slots. Since the phase relationship of the sub-carrier to the start of each successive time slot between 1 and n can be predicted, n sets of sync or pilot symbols can be computed so that the combination of the phase shifted sub-carrier with the precomputed pilot or sync symbols results in identical sync and pilot symbols for each time slot. However, this solution results in a proliferation of distinct pilot and sync symbols, increasing memory requirements in the system as well as prolonging symbol detect time.

What is claimed is:

1. In a digital communication system in which pulse-shape filtered sync, pilot, and data symbols, arranged in successive time slots, modulate sub-channel carriers via sub-channel mixers for combination into a composite signal for transmission, wherein each time slot includes a deterministic portion comprising sync and pilot symbols and a non-deterministic portion comprising data symbols, a method for ensuring that the deterministic portion of each time slot is substantially identical in each time slot, the method comprising the steps of:

(a) determining the phase difference of the sub-channel mixer signals from the start of a first time slot of the successive time slots to the start of a second, subsequent time slot of the successive time slots; and (b) rotating the phase of each sub-channel symbol stream, on a per-slot basis, by an amount equal to the phase difference determined in step (a), but with opposite sign.

2. The method in accordance with claim 1, wherein the step (a) of determining the phase difference comprises calculating the phase difference based upon time-slot length, sub-carrier frequency, and sub-carrier phase.

3. The method in accordance with claim 1, wherein step (b) comprises rotating the phase of each sub-channel symbol stream by a phase of $-i\theta$, where $\theta$ is the phase difference determined in step (a) and i identifies slot number.

4. In a digital communication system in which pulse-shape filtered sync, pilot, and data symbols, arranged in successive time slots, modulate sub-channel carriers via sub-channel mixers for combination into a composite signal for transmission, wherein each time slot includes a deterministic portion comprising sync and pilot symbols and a non-deterministic portion comprising data symbols, apparatus for ensuring that the deterministic portion of each time slot is substantially identical in each time slot comprising:

means for determining the phase difference of the sub-channel mixer signals from the start of a first time slot of the successive time slots to the start of a second, subsequent time slot of the successive time slots; and means for rotating the phase of each sub-channel symbol stream, on a per-slot basis, by an amount equal to the phase difference determined in step (a), but with opposite sign.

5. In a digital communication system in which pulse-shaped filtered sync, pilot, and data symbols, arranged in successive time slots, modulate sub-channel carriers for combination into a composite signal for transmission, wherein each time slot includes a deterministic portion comprising sync and pilot symbols and a non-deterministic portion comprising data symbols, a method for ensuring that the deterministic portion of each time slot is substantially identical in each time slot, the method comprising the steps of:

(a) computing sets of pilot and data symbols for each time slot of each sub-channel, based upon phase shift of the sub-carriers for each time slot; and (b) inserting the appropriate pilot and data symbols into each time slot such that combination of sub-carrier phase shift and selected sync and pilot symbols results in the sync and pilot signals being identical in each time slot.

6. In a multi-sub-channel, time domain pilot-based, TDM, linear modulation communication system, a method for ensuring that sync and pilot waveform components of sub-channel symbol streams are identical in successive time slots, the method comprising the steps of:

(a) inserting sync and pilot symbols of predetermined magnitude and phase in each sub-channel symbol stream in a predetermined pattern;

(b) rotating phase of the symbol streams on a per slot basis with each symbol in a given slot rotated by the same value;

(c) pulse shape filtering each of the resultant sub-channel symbol streams;

(d) modulating sub-channel carrier signals with each pulse shape filtered signal to provide sub-channel signals at desired carrier frequencies; and (e) summing the resultant sub-channel signals to generate a composite signal for transmission.

* * * * *